June 21, 1949.   H. S. HARVEY   2,473,883
POWER OPERATED PORTABLE GENERAL UTILITY MACHINE
Filed Feb. 13, 1945   2 Sheets-Sheet 1
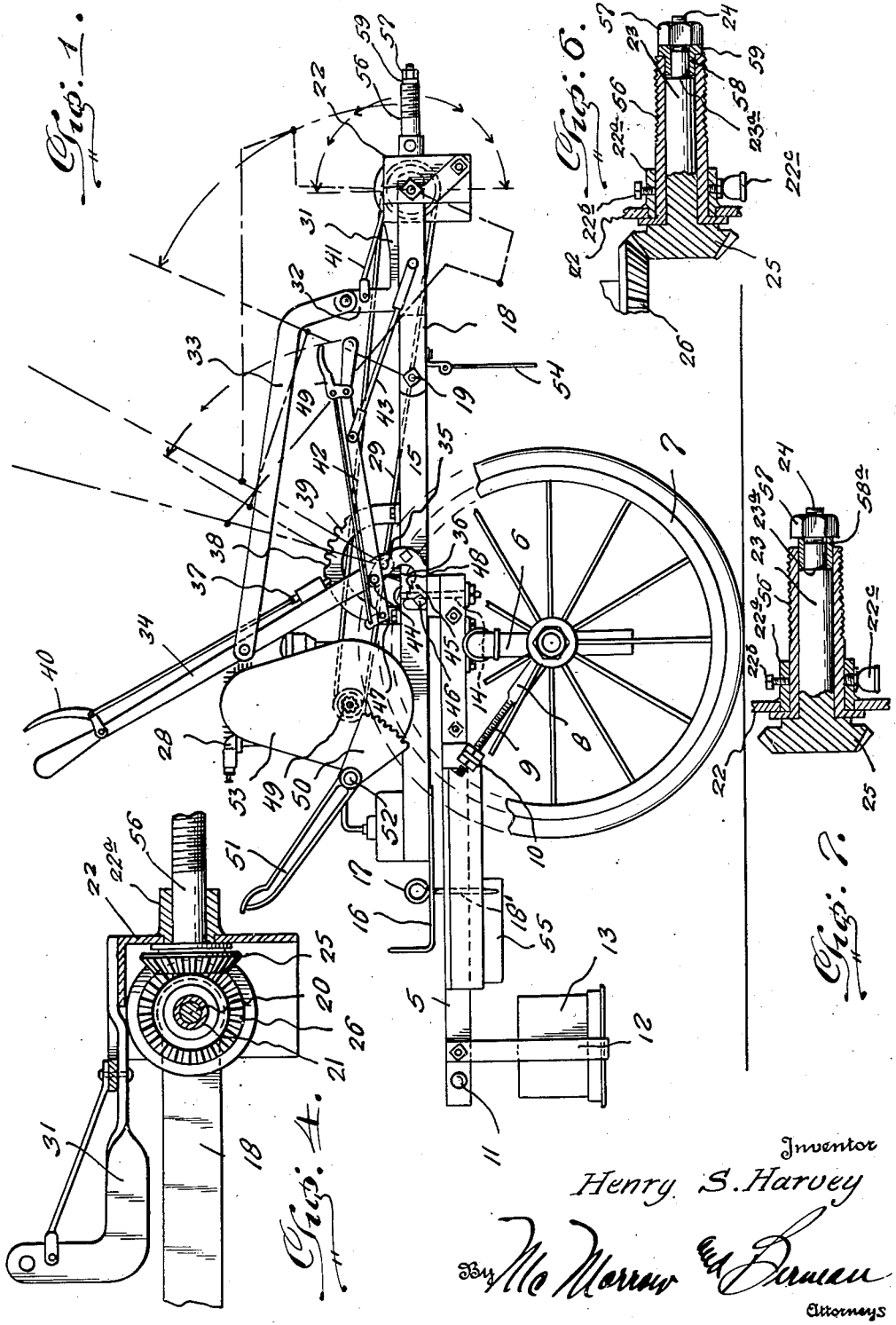
Inventor
Henry S. Harvey
Attorneys

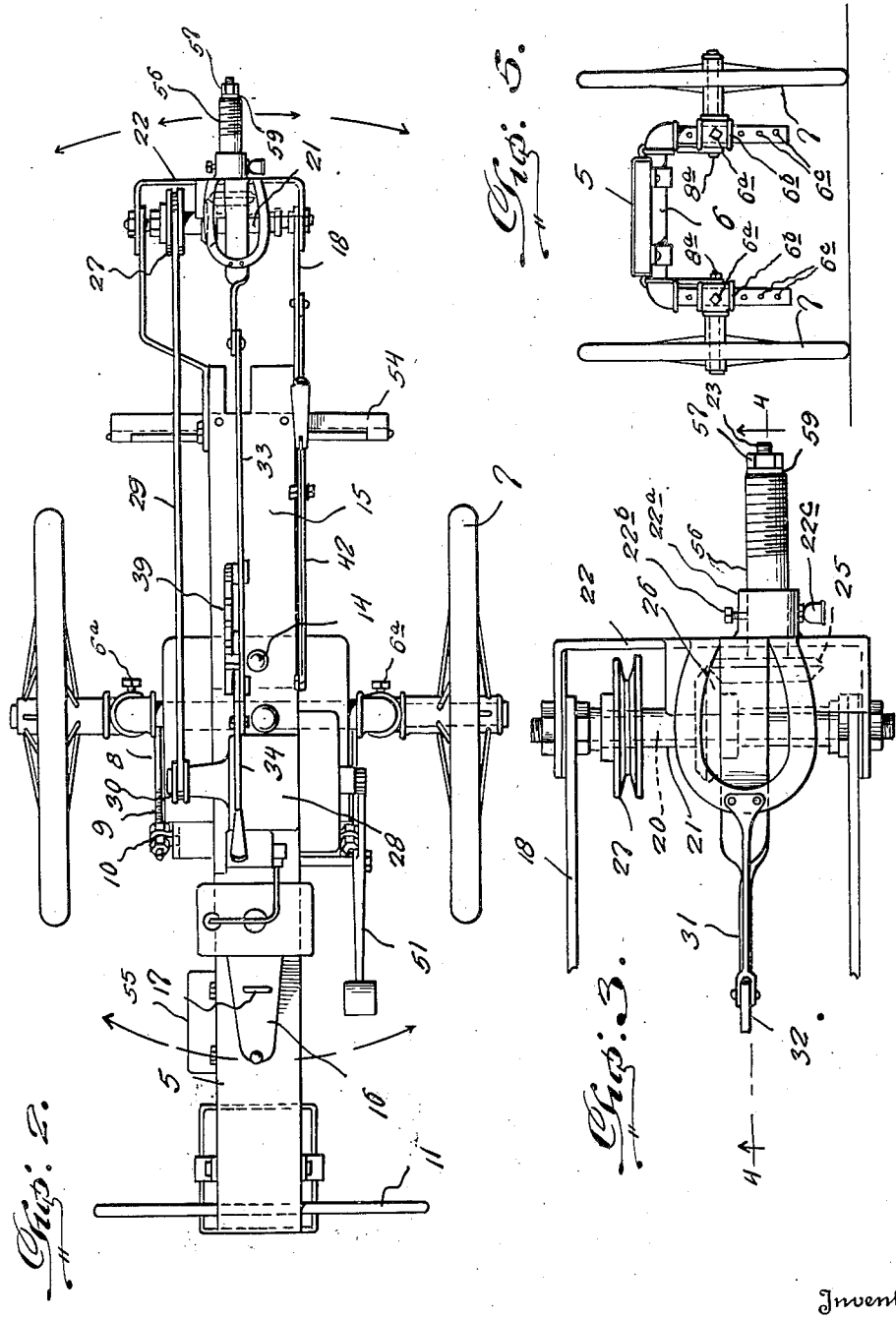

Patented June 21, 1949

2,473,883

UNITED STATES PATENT OFFICE 2,473,883

POWER-OPERATED PORTABLE GENERAL UTILITY MACHINE

Henry S. Harvey, West Branch, Iowa

Application February 13, 1945, Serial No. 577,701

7 Claims. (Cl. 74—16)

1

The present invention relates to new and useful improvements in power operated general utility machines adapted for use in driving various types of tools and implements for farm and other purposes and the invention has for its primary object to provide a mounting for a rotatable tool or implement carried by a frame on a vehicle and in which the frame is mounted for horizontal swinging movement and in which the tool mounting is adapted for vertical swinging movement whereby the tool may be adjusted to a desired position for performing its useful work.

A further object of the invention is to provide power driven means for the tool and in which the tool mounting is carried by a pivotal extension on the vehicle frame and adapted upon a pivotal movement of such extension to throw the tool into and out of operative engagement with the power plant.

A further object of the invention is to provide a power driven general utility apparatus of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view.

Figure 2 is a top plan view.

Figure 3 is an enlarged top plan view of the pivotal power driven tool mounting.

Figure 4 is a sectional view taken substantially on a line 4—4 of Figure 3, and

Figure 5 is a front elevational view of the lower vehicle frame.

Figure 6 is an enlarged, detail, sectional view, illustrating the gearing and drive shafts.

Figure 7 is an enlarged, detail, sectional view, similar to the view of Figure 6, illustrating a modified form of bushing for the drive shaft.

Referring now to the drawings in detail, wherein for the purpose of illustration I have disclosed a preferred embodiment of the invention, the numeral 5 designates a lower vehicle frame having its front end bolted or otherwise suitably secured on an axle 6 on which the ground wheels 7 are journaled. Braces 8 are connected to the axle 6 by means of set screws 8a and extend from the axle upwardly and rearwardly and formed with screws 9 at their upper ends for adjustably

2 connecting to brackets 10 carried at the side edges of the frame 5.

The frame 5 and axle 6 may be lowered and raised and may be maintained in desired position by means of bolts 6a extending through T-shaped fitting 6b and into openings 6c, which may be threaded if desired to receive the threaded end of bolt 6a, thereby enabling the operator to adjust the height of the machine for different kinds of work.

The rear of the frame 5 is provided with laterally extending handles 11 by means of which the vahicle may be manually pushed along the ground and a hanger bracket 12 is suspended from the rear portion of the frame 5 and on which a receptacle 13 may be supported for carrying water or the like. The bracket 12 and the receptacle 13 may be of any desired shape or size.

Rising from the front end of the frame 5 is a pin 14 on which an upper frame 15 is pivotally mounted for horizontal swinging movement. It will be understood, of course, that the upper frame is removable and may, if desired, be removed from the vehicle and mounted on a work bench or the like. To the rear end of the pivoted frame 15 is secured a handle 16 having a locking pin 17 inserted therethrough and adapted for insertion in an opening 18' of the frame 5 to secure the frame 15 against pivotal movement, when desired.

A pair of arms 18 project forwardly from the frame 15, in substantially spaced parallel relation to each other, the rear ends of the arms being pivotally mounted to the front end of the frame 15 by pins 19 for vertical swinging movement of the arms 18.

The front ends of the arms 18 have a shaft or rod 20 secured thereto and on which a tubular shaft 21 is journaled. The shaft or rod 20 also serves to secure a U-shaped tool shaft mounting 22 to the front ends of the arms 18. The mounting 22 may be readily removed to facilitate the utilization of various rotary tools. A solid shaft 23 is journaled in the mounting 22 through a hollow shaft 56, the front end of the shaft 23 being threaded, as at 24, and adapted for attaching a suitable rotary tool or implement thereto.

Referring now to Figures 3 and 6, a nut 57 may be threaded on one end of solid shaft 23 and positioned on shaft 23, between a shoulder thereof 23a and nut 57, is a bushing 58, having an annular rim portion 59, whereby by tightening of nut 57 will force bushing 58 into engagement with shafts 23 and 56 for a frictional drive of shaft 56, or a positive drive, as desired. A bearing 22a is mounted on shaft 56 as a part of or separable from mounting 22, and may be secured to shaft 56 by means of a set screw 22b and has a conventional grease cup 22c.

Referring now to Figure 7, the parts shown are the same as in Figure 6, with the exception of the modified form of bushing 58a which is provided with no rim portion and in which the two shafts 23 and 56 are not interconnected, so that shaft 23 may be used without the outside hollow shaft being frictionally or positively driven.

To the rear end of the solid shaft 23 is secured a bevel gear 25 engaging a similar gear 26 secured to the shaft 21. A pulley 27 is also secured to the shaft 21 and is driven from an engine or power plant 28 which may be any desired, convenient size or shape, conventional gasoline, electric, or other type motor, by means of a belt 29 from a pulley 30 connected to the power plant.

When the arms 18 are in their forwardly extended horizontal position the belt 29 will be held taut to provide a driving connection between the engine 28 and the shaft 21 and gears connected thereto.

The mounting 22 for the shaft 23 is pivoted on the shaft or rod 20 for vertical swinging movement and may be raised or lowered by means of a bracket 31 projecting rearwardly from the mounting 22 and formed at its rear end with an upstanding extension 32. To the upper end of the extension 32 is pivotally attached the front end of an arm 33 extending rearwardly above the frame 15 and pivotally attached at its rear end to the intermediate portion of a lever 34 pivoted at its lower end as at 35 on a bracket 36 secured to the frame 15. A spring projected bolt 37 is carried by the lever 34 for engaging the notches 38 of a quadrant 39 secured to the frame 15 whereby to lock the lever in an adjusted position. The bolt 37 is released by means of the handle 40 in the usual manner. A brace 41 connects the forward edge of the mounting 22 with the upstanding extension 32.

The arms 18 are raised and lowered by means of a lever 42 connected to one of the arms 18 by means of a link 43, the lever 42 being pivoted as at 44 to a bracket 45 secured to the frame 15 by the bolts 46. A dog 47 is pivoted to the inner end of the lever 42 adapted for engaging teeth 48 formed on the bracket 45, the dog being actuated by a handle 49 carried by the lever 42.

Accordingly the arms 19 may be raised or lowered by means of the lever 42 whereby the shaft mounting 22 at the outer ends of the arms may likewise be raised and lowered independently of the pivotal mounting of said shaft mounting to thus produce a slackening of the belt 29 and interrupt operation of the shaft 23.

The drive shaft of the engine 28 is provided with a pinion 49 adapted for engagement by a gear segment 50 on one end of a lever 51 pivoted, as at 52, on the shield 53 of the motor whereby through an operation of the lever 51 to start the motor.

A guard 54 may be pivotally suspended from the front end of the frame 15.

A tool box 55 is suitably secured to frame 15 in any desired manner, at any desired location on the frame, but is preferably attached on the left side of frame 15, as shown in Figures 1 and 2.

In operation of the device any desired rotary tool or implement may be used. A circular saw, rotary knife, rotary weeder, digger, abrasive wheel, or any type of rotary implement may be attached to the shaft 23 and driven through the operation of the engine 28 by means of the belt 29 and gears 25 and 26. The position of the rotary tool or implement on the shaft 23 may be adjusted vertically by pivotally swinging the tool mounting 22 through the lever 34, or the tool may be swung horizontally by means of the bodily swinging movement of the frame 15. Similarly a friction or positive drive of the outside hollow shaft may be simultaneously effected if desired, by tightening nut 57, or by using the modified form of bushing shown in Figure 7, the inside solid shaft 23 only may be driven.

It will be understood, of course, that the machine and the parts may be of any desired size and that a miniature model of same could be utilized as a child's toy, if desired, and that while I have illustrated and described my invention in some detail, I am not to be limited to such details, but only by the spirit of the invention and the scope of the appended claims.

Having thus described the invention, what I claim is:

1. An apparatus of the class described comprising a frame, a tool mounting including a shaft journaled therein and adapted for attaching a tool to the shaft, a support pivotally attached at one end of the frame, means pivotally mounting the tool mounting on the support, said support and tool mounting being adapted for independent vertical swinging movement, a power plant mounted on the frame, means operatively connecting the power plant with the tool shaft, means for raising and lowering the support and the tool mounting, said raising movement of the support operating to interrupt the drive connection for the shaft, and means independent of said first means for raising and lowering the tool mounting.

2. An apparatus of the class described comprising a frame, a tool mounting including a shaft journaled therein and adapted for attaching a tool to the shaft, a support pivotally attached at one end of the frame, means pivotally mounting the tool mounting on the support, said support and tool mounting being adapted for independent vertical swinging movement, a power plant mounted on the frame, means operatively connecting the power plant with the tool shaft, a manually operated lever pivotally carried by the frame for raising and lowering the tool mounting and a manually operated lever pivotally carried by the frame and operatively connected to the support for raising and lowering the latter, said raising movement of the support operating to interrupt the drive connection between the motor and the shaft.

3. An apparatus of the class described comprising a frame, a support extending forwardly of the frame and pivotally attached thereto for vertical swinging movement, a shaft mounting pivotally attached to the support and also adapted for vertical swinging movement, said mounting having a shaft journaled therein and adapted for attaching a tool thereto, a power plant on the frame, a belt operatively connecting the power plant to the shaft, manually operated means connected to the mounting for vertically swinging the latter and manually operated means connected to the support for vertically swinging the support and operable to slacken the belt.

4. An apparatus of the class described comprising a frame, a pair of arms pivotally attached to the frame and extending forwardly thereof in substantially spaced parallel relation, a shaft journaled in the outer ends of said arms, a shaft mounting pivoted to said arms on the axis of said shaft, a driven shaft journaled in said mounting and adapted for attaching a tool thereto, a power plant mounted on the frame, belt drive means operatively connecting the power plant with the first-named shaft and manually operated means for independently raising and lowering the arms and said shaft mounting, the raising movement of said arms operating to slacken the belt.

5. A power operated device of the class described comprising a vertically adjustable frame, a frame pivoted to the first-named frame for horizontal swinging movement, a vertically swingable tool mounting carried by the pivoted frame and including a shaft journaled in the mounting and adapted for attaching a tool thereto, a hollow shaft journaled around said tool shaft and means for frictionally engaging said hollow shaft with said tool shaft for rotation therewith, a power plant mounted on the pivoted frame, means operatively connecting the tool shaft with the power plant and manually operated means for raising and lowering said tool mounting.

6. An apparatus of the class described comprising a vertically adjustable frame, a second frame pivoted on the vehicle frame for horizontal swinging movement, tool mountings including a hollow shaft and a tool shaft journaled therein and adapted for attaching tools to said shafts, a support pivotally attached at one end of the frame, means pivotally mounting the tool mounting on the support, said support and tool mounting being adapted for independent vertical swinging movement, a power plant mounted on the frame, means operatively connecting the power plant with the tool shaft means for operatively connecting the hollow shaft to the tool shaft, and independent means for raising and lowering the support and the tool mounting, said raising movement of the support interrupting the drive connection for the shaft.

7. An apparatus of the class described comprising a vertically adjustable frame, a support extending forwardly of the frame and pivotally attached thereto for vertical swinging movement, a shaft mounting pivotally attached to the support and also adapted for vertical swinging movement, said mounting having a hollow shaft and a solid shaft journaled therein and adapted for attaching tools thereto, a power plant on the frame, a belt operatively connecting the power plant to the solid shaft, means for operatively engaging the hollow shaft with the solid shaft, manually operated means connected to the mounting for vertically swinging the latter, and manually operated means connected to the support for vertically swinging the support and operable to slacken the belt.

HENRY S. HARVEY.

REFERENCES CITED

The following references are of record in the file of this patent:

UNITED STATES PATENTS

| Number | Name | Date |
| --- | --- | --- |
| 1,055,476 | Krayer | Mar. 11, 1913 |
| 1,151,966 | Powell | Aug. 31, 1915 |
| 1,397,324 | Moore | Nov. 15, 1921 |
| 1,771,629 | Hoe | July 29, 1930 |
| 1,848,529 | Hoe | Mar. 8, 1932 |
| 2,350,880 | Dellinger et al. | June 6, 1944 |
| 2,368,731 | Snyder et al. | Feb. 6, 1945 |